(12) United States Patent
Bacastow

(10) Patent No.: US 8,566,924 B2
(45) Date of Patent: Oct. 22, 2013

(54) METHOD AND SYSTEM FOR CONTROLLING COMMUNICATION PORTS

(75) Inventor: Steven V. Bacastow, Cumming, GA (US)

(73) Assignee: Six Circle Limited Liability Company, Wilmington, DE (US)

( * ) Notice: Subject to any disclaimer, the term of this patent is extended or adjusted under 35 U.S.C. 154(b) by 0 days.

(21) Appl. No.: 13/208,660

(22) Filed: Aug. 12, 2011

(65) Prior Publication Data

US 2011/0302568 A1    Dec. 8, 2011

Related U.S. Application Data

(63) Continuation of application No. 11/879,162, filed on Jul. 16, 2007, now Pat. No. 8,011,013.

(60) Provisional application No. 60/832,003, filed on Jul. 19, 2006.

(51) Int. Cl.
*G06F 9/312* (2006.01)
*G06F 17/40* (2006.01)

(52) U.S. Cl.
USPC ............................................ 726/20; 713/165

(58) Field of Classification Search
None
See application file for complete search history.

(56) References Cited

U.S. PATENT DOCUMENTS

| | | |
|---|---|---|
| 5,331,136 A | 7/1994 | Koench et al. |
| 5,566,339 A | 10/1996 | Perholtz et al. |
| 5,590,038 A | 12/1996 | Pitroda |
| 5,592,618 A | 1/1997 | Micka et al. |
| 5,696,909 A | 12/1997 | Wallner |
| 5,790,074 A | 8/1998 | Rangedahl et al. |
| 5,844,776 A | 12/1998 | Yamaguchi et al. |
| 5,884,271 A | 3/1999 | Pitroda |
| 5,956,733 A | 9/1999 | Nakano et al. |
| 5,979,753 A | 11/1999 | Roslak |
| 6,003,008 A | 12/1999 | Postrel et al. |
| 6,062,478 A | 5/2000 | Izaguirre et al. |
| 6,166,688 A | 12/2000 | Cromer et al. |
| 6,442,682 B1 | 8/2002 | Pothapragada et al. |
| 6,546,441 B1 | 4/2003 | Lum |
| 6,553,348 B1 | 4/2003 | Hashimoto |
| 6,574,716 B2 | 6/2003 | Dovi |
| 6,614,349 B1 | 9/2003 | Proctor et al. |
| 6,640,217 B1 | 10/2003 | Scanlan et al. |
| 6,704,885 B1 | 3/2004 | Salas-Meza et al. |

(Continued)

FOREIGN PATENT DOCUMENTS

WO     WO 03/009620     1/2003

OTHER PUBLICATIONS

USB & other portabale storage device usage. Gorge, Mathieu. Computer Fraud & Security. Aug. 2005.*

(Continued)

*Primary Examiner* — Venkat Perungavoor
(74) *Attorney, Agent, or Firm* — Stolowitz Ford Cowger LLP

(57) ABSTRACT

A method for limiting devices and controlling the applications executed from USB ports on personal computers (PCs). More specifically, the present invention relates to a method for ensuring that only authorized devices and applications are accessed from USB ports using software and configuration files on the PC. Using the software application stored on the PC storage device in conjunction with functionality performed by a designed security file server, the use of USB applications and devices is limited to authorized applications and devices.

22 Claims, 6 Drawing Sheets

Unauthorized Device

Local or Remote User

Laptop (PC)
Unauthorized USB Printer

1. An un-authorized device such as a printer is inserted to the USB port of a local or remote PC.
2. The invention on the PC is configured to prevent the printer from connecting.

(56) References Cited

U.S. PATENT DOCUMENTS

| | | | |
|---|---|---|---|
| 6,925,439 B1 | 8/2005 | Pitroda | |
| 6,950,949 B1 | 9/2005 | Gilchrist | |
| 6,957,329 B1* | 10/2005 | Aleksic et al. | 713/150 |
| 7,103,684 B2 | 9/2006 | Chen et al. | |
| 7,111,307 B1* | 9/2006 | Wang | 719/321 |
| 7,143,289 B2 | 11/2006 | Denning et al. | |
| 7,165,154 B2 | 1/2007 | Coombs et al. | |
| 7,225,208 B2 | 5/2007 | Midgley et al. | |
| 7,229,016 B2 | 6/2007 | Bravo | |
| 7,263,190 B1 | 8/2007 | Moritz | |
| 7,269,732 B2 | 9/2007 | Kilian-Kehr | |
| 7,308,426 B1 | 12/2007 | Pitroda | |
| 7,349,871 B2 | 3/2008 | Labrou | |
| 7,353,382 B2 | 4/2008 | Labrou | |
| 7,356,510 B2 | 4/2008 | Durand et al. | |
| 7,356,703 B2 | 4/2008 | Chebolu et al. | |
| 7,403,743 B2 | 7/2008 | Welch | |
| 7,404,088 B2 | 7/2008 | Giobbi | |
| 7,421,516 B2 | 9/2008 | Minogue et al. | |
| 7,464,862 B2 | 12/2008 | Bacastow | |
| 7,552,094 B2 | 6/2009 | Park et al. | |
| 7,561,691 B2 | 7/2009 | Blight et al. | |
| 7,574,220 B2 | 8/2009 | Purkayastha et al. | |
| 7,606,560 B2 | 10/2009 | Labrou | |
| 7,706,369 B2 | 4/2010 | Roese et al. | |
| 7,739,402 B2 | 6/2010 | Roese et al. | |
| 7,801,826 B2 | 9/2010 | Labrou | |
| 7,822,688 B2 | 10/2010 | Labrou | |
| 7,841,534 B2 | 11/2010 | Bacastow | |
| 8,011,013 B2 | 8/2011 | Bacastow | |
| 8,037,304 B2 | 10/2011 | Rensin et al. | |
| 8,041,947 B2 | 10/2011 | O'Brien et al. | |
| 2002/0082925 A1 | 6/2002 | Herwig | |
| 2002/0169979 A1* | 11/2002 | Zimmer | 713/200 |
| 2002/0188856 A1 | 12/2002 | Worby | |
| 2002/0193157 A1 | 12/2002 | Yamada et al. | |
| 2003/0005193 A1 | 1/2003 | Seroussi et al. | |
| 2003/0046034 A1 | 3/2003 | Kitamoto et al. | |
| 2003/0050940 A1 | 3/2003 | Robinson | |
| 2003/0055792 A1 | 3/2003 | Kinoshita et al. | |
| 2003/0074575 A1 | 4/2003 | Hoberock et al. | |
| 2003/0110371 A1 | 6/2003 | Yang et al. | |
| 2003/0115126 A1 | 6/2003 | Pitroda | |
| 2003/0135418 A1 | 7/2003 | Shekhar et al. | |
| 2003/0174167 A1 | 9/2003 | Poo et al. | |
| 2003/0225971 A1 | 12/2003 | Oishi et al. | |
| 2003/0233501 A1 | 12/2003 | Ma et al. | |
| 2003/0236872 A1 | 12/2003 | Atkinson | |
| 2004/0001088 A1 | 1/2004 | Stancil et al. | |
| 2004/0003262 A1* | 1/2004 | England et al. | 713/189 |
| 2004/0019742 A1 | 1/2004 | Wei et al. | |
| 2004/0038592 A1 | 2/2004 | Yang | |
| 2004/0039575 A1 | 2/2004 | Bum | |
| 2004/0039851 A1 | 2/2004 | Tang et al. | |
| 2004/0039854 A1 | 2/2004 | Estakhri et al. | |
| 2004/0095382 A1 | 5/2004 | Fisher et al. | |
| 2004/0107170 A1 | 6/2004 | Labrou | |
| 2004/0158499 A1 | 8/2004 | Dev | |
| 2005/0010768 A1 | 1/2005 | Light et al. | |
| 2005/0010835 A1 | 1/2005 | Childs et al. | |
| 2005/0081198 A1 | 4/2005 | Cho et al. | |
| 2005/0125513 A1 | 6/2005 | Sin-Ling Lam et al. | |
| 2005/0138390 A1 | 6/2005 | Adams et al. | |
| 2005/0144443 A1 | 6/2005 | Cromer et al. | |
| 2005/0149394 A1 | 7/2005 | Postrel | |
| 2005/0149684 A1 | 7/2005 | Sankaran et al. | |
| 2005/0149745 A1 | 7/2005 | Ishidoshiro | |
| 2005/0216466 A1 | 9/2005 | Miyamoto et al. | |
| 2005/0247777 A1 | 11/2005 | Pitroda | |
| 2005/0274798 A1 | 12/2005 | Bacastow | |
| 2006/0010325 A1 | 1/2006 | Liu et al. | |
| 2006/0041934 A1 | 2/2006 | Hetzler | |
| 2006/0206720 A1* | 9/2006 | Harada et al. | 713/182 |
| 2006/0209337 A1 | 9/2006 | Atobe et al. | |
| 2006/0248542 A1* | 11/2006 | Wang et al. | 719/321 |
| 2006/0253620 A1 | 11/2006 | Kang | |
| 2007/0022058 A1 | 1/2007 | Labrou | |
| 2007/0055635 A1 | 3/2007 | Kanapur | |
| 2007/0081508 A1 | 4/2007 | Madhavan et al. | |
| 2007/0124211 A1 | 5/2007 | Smith | |
| 2007/0143529 A1 | 6/2007 | Bacastow | |
| 2007/0198432 A1 | 8/2007 | Pitroda et al. | |
| 2007/0214047 A1 | 9/2007 | Antonello et al. | |
| 2007/0245158 A1 | 10/2007 | Giobbi et al. | |
| 2008/0005426 A1 | 1/2008 | Bacastow et al. | |
| 2008/0022003 A1 | 1/2008 | Alve | |
| 2008/0022360 A1 | 1/2008 | Bacastow | |
| 2008/0081608 A1 | 4/2008 | Findikli et al. | |
| 2008/0114659 A1 | 5/2008 | Pitroda | |
| 2008/0177826 A1 | 7/2008 | Pitroda | |
| 2008/0227391 A1 | 9/2008 | Rosenberg | |
| 2009/0010503 A1 | 1/2009 | Mathiassen et al. | |
| 2009/0150247 A1 | 6/2009 | Bacastow | |
| 2011/0040641 A1 | 2/2011 | Bacastow | |
| 2011/0071949 A1 | 3/2011 | Petrov | |
| 2011/0231274 A1 | 9/2011 | Joao | |

OTHER PUBLICATIONS

Securing portable storage devices. Watson. Network Security. Jul. 2006.*
Tracking USB storage: Analysis of windows artifacts generated by USB storage devices by Carvey et al. ElSevier. Apr. 13, 2005.*
Gamble, Richard H., PINning Hopes on e-Commerce Debit, Transaction Trends, Nov. 2010, pgs. 18-20.
Stolowitz Ford Cowger Llp, Listing of Related Cases, Dec. 7, 2011.
Iomega Automatic Backup Manual Table of Contents (hereafter "IAB" archived on Dec. 22, 2002 at: http://web.archive.org/web/200212221720 18/http://www.iomega.com/supportlmanuals/ioauto/main.html (linking to 22 pages hereafter "IAB 1" . . . "IAB22").
http://web.archive.org/web/20021030 183837/www.iomega.com/support/manuals/ioauto/gs_setup.html (hereafter "IAB 1") (archived in 2002).
http://web.archive.org!web/2002 1223 082620/www. iomega. com/support/manuals/ioauto/qs_schedule.html (hereafter "IAB II") (archived in 2002).
http://web.archive.org/web/20021223081144/www.iomega.com/support/manuals/ioauto/qs_cache.html (hereafter "IAB 12") (archived in 2002).
http://web.archive.org/web/20021223075646/www. iomega. com/support/manuals/ioauto/qs_nomonitor.html (hereafter "IAB 13") (archived in 2002).
http://web.archive.org!web20021223081714/www.iomega.com/supportlmanuals/ioauto/qs qs_restore.html (hereafter "IAB 15") (archived in 2002).
U.S. Appl. No. 11/141,837, *Apparatus & Method for POS Processing*, filed Jun. 1, 2005, Utility, US.
U.S. Appl. No. 11/807,008, *Apparatus and Method for Securing Portable USB Storage Devices*, filed May 26, 2007, Utility, US.
U.S. Appl. No. 11/879,162, *Method for Securing and Controlling USB Ports*, filed Jul. 16, 2007, Utility, US.
U.S. Appl. No. 12/283,644, *Apparatus & Method for POS Processing*, filed Sep. 15, 2008, Utility, US.
U.S. Appl. No. 12/906,375, *Apparatus and Method for POS Processing*, filed Nov. 18, 2010, Utility, US.
U.S. Appl. No. 13/175,214, *Apparatus and Method for Securing Portable USB Storage Devices*, filed Jul. 1, 2011, Utility, US.

* cited by examiner

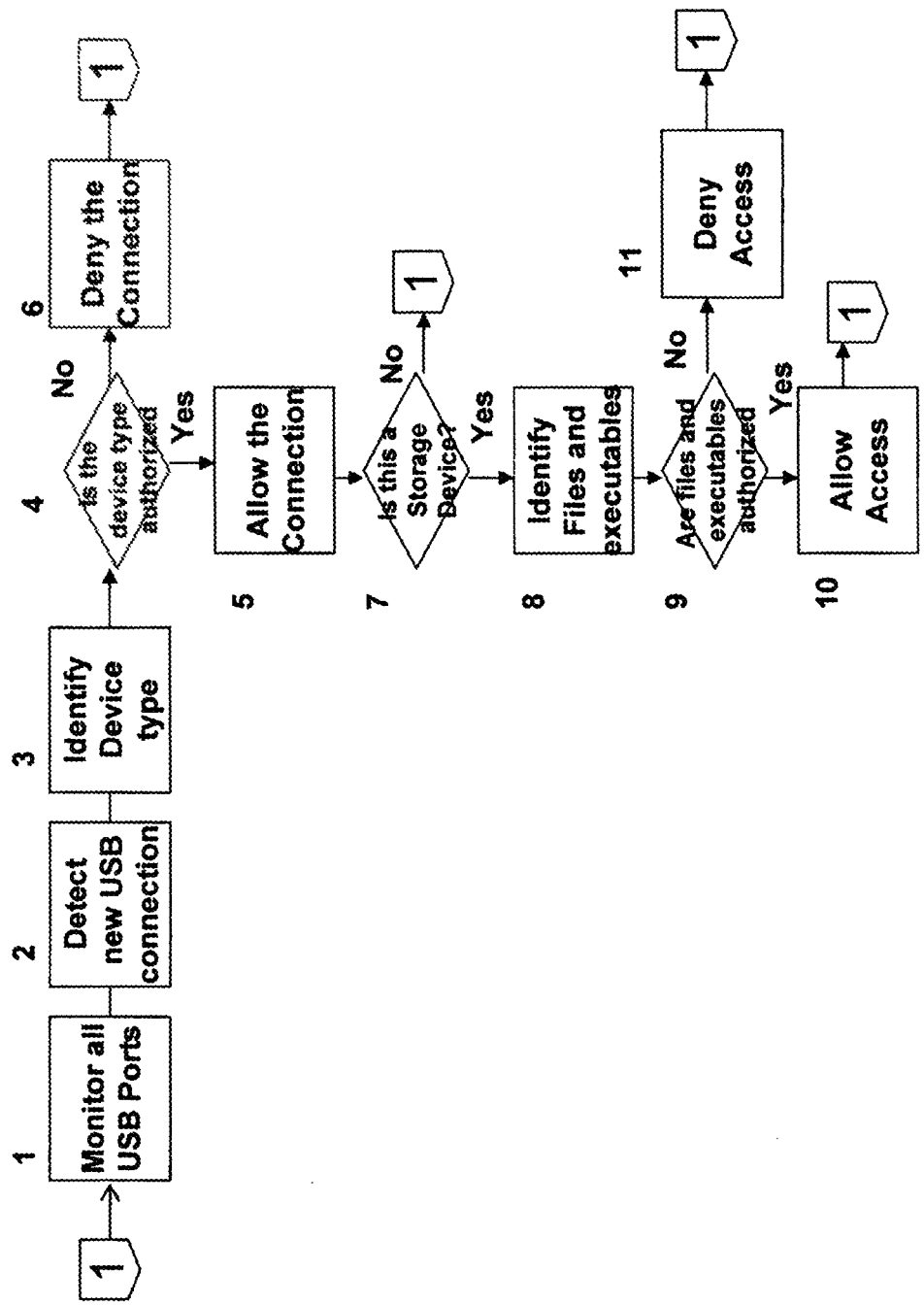

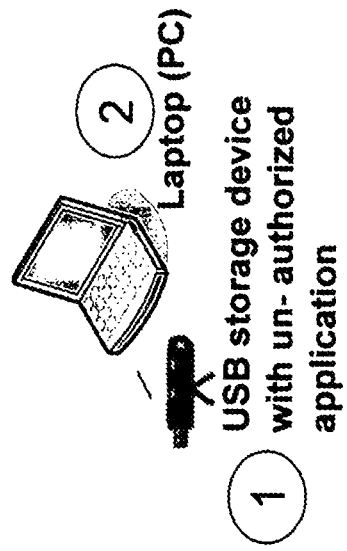
Figure 2 – Unauthorized Application

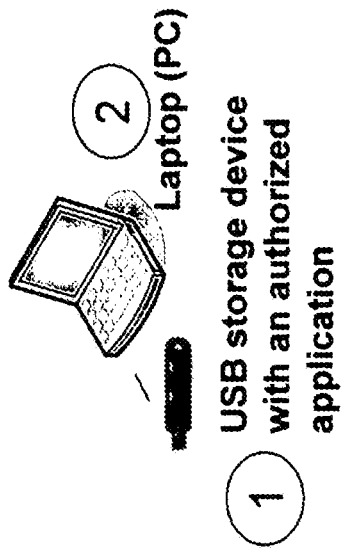
Figure 3 – Authorized Application

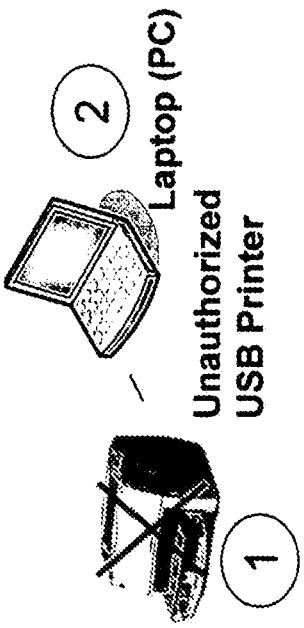
Figure 4 – Unauthorized Device

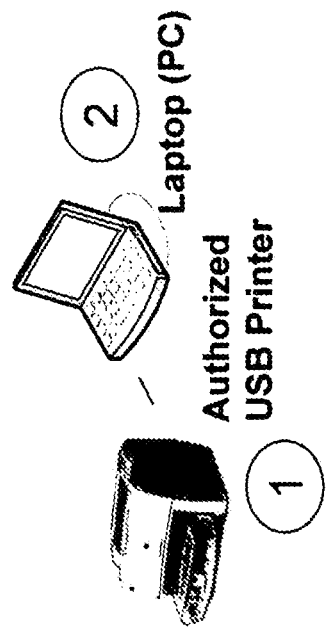

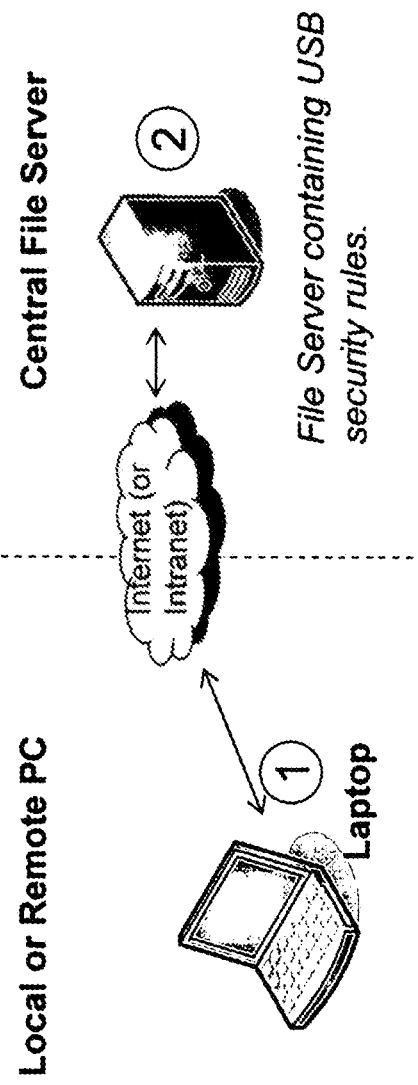

METHOD AND SYSTEM FOR CONTROLLING COMMUNICATION PORTS

RELATED APPLICATIONS

This application is a continuation of and claims priority to U.S. patent application Ser. No. 11/879,162, filed Jul. 16, 2007, now U.S. Pat. No. 8,011,013 and titled "Method for Securing and Controlling USB Ports," which claims priority to U.S. Provisional Patent Application Ser. No. 60/832,003, filed Jul. 19, 2006. The content of all of these prior applications is hereby fully incorporated herein by reference.

COPYRIGHT NOTICE

A portion of the disclosure of this patent document may contain material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

FIELD OF THE INVENTION

The present invention relates to a method for limiting devices and controlling the applications executed from USB ports on personal computers (PCs). More specifically, the present invention relates to a method for ensuring that only authorized devices and applications are accessed from USB ports using software and configuration files on the PC.

BACKGROUND OF THE INVENTION

There has been a significant increase in the use of portable USB storage devices to store, backup, and transfer information between PCs and locations. Conventional methods for controlling the devices and applications that may be accessed from USB ports are insufficient to address the current and growing risk related to these devices and applications.

Individuals, corporations and government agencies are increasingly becoming uncomfortable with allowing employees and other authorized personnel to utilize portable USB storage devices to store or transfer sensitive data and information. However, current methods lack the ability to easily prevent or detect the use of USB storage devices and computer applications accessed from USB storage devices.

Current methods also lack the ability to allow an individual, a corporation or a government agency to effectively control types of other USB non-storage devices which may be utilized. These devices include printers, scanners, cameras, music players, and other devices which may or may not be authorized.

It is estimated that over 130 million portable USB storage devices will be sold worldwide in 2007. The majority of these devices are predicted to be "smart drives", which will include executable computer programs. These portable USB storage devices and the applications executed from them may not be authorized by the security policy or PC user. Therefore, as a result of the potential exposure related to USB devices, these devices are often prohibited by many corporate and government security policies. Although the devices themselves are often prohibited by policy, it is difficult to prevent or detect their usage with current methods.

This invention addresses these issues through a method which detects the use of portable USB storage devices and the applications executed from these devices and limits the devices and applications based on user defined criteria. Consequently, the invention may also be used to prevent or detect the use of other USB devices such as printers, scanners, cameras, music players, and other devices that can be attached to a USB port on a protected PC.

As a result of the limitations related to current methods, portable USB storage devices are considered to be a significant cause of exposure related to the potential loss of confidential data and information Therefore, a need exists for ensuring that only authorized devices and applications are accessed from USB ports that addresses these shortcomings in the prior art.

SUMMARY OF THE INVENTION

The present invention answers this need by providing a method for limiting the type of device and application that may be connected to, or executed from a USB port.

The invention consists of software that is either pre-loaded on the PC or installed and configured by the user. Software is configured to accommodate the levels of security as required by the user or organization. The configuration of security parameters may vary between PCs and organizations and may be controlled locally by the user or by a central rules database via connection through the internet or intranet connection.

In an embodiment of the present invention, the software is configured to limit (e.g. allow or deny) the use of devices connected via a USB port on the protected PC.

In other embodiments of the invention, the software is configured to limit (e.g. allow or deny) access to the files and applications stored on storage devices connected to the USB port on the protected PC.

It is thus an advantage of the present invention to provide a flexible method for selectively limiting devices and the files and applications executed from USB ports on protected personal computers. To this end, the present invention is new and unique in both its conception and implementation.

Embodiments of the present invention are described below by way of illustration. Other approaches to implementing the present invention and variations of the described embodiments may be constructed by a skilled practitioner and are considered within the scope of the present invention.

BRIEF DESCRIPTION OF THE DRAWINGS

FIG. 1 shows the general steps that are followed by the invention in accordance with its method.

FIG. 2 shows an example whereby the invention denies access to an un-authorized USB storage device.

FIG. 3 shows an example whereby the invention allows access to an authorized USB storage device.

FIG. 4 shows an example whereby the invention denies access to an un-authorized USB non-storage device, in this case a printer.

FIG. 5 shows an example whereby the invention allows access to an authorized USB non-storage device, in this case a printer.

FIG. 6 shows an example whereby the invention is configured to get security parameter updates from a central file server.

DETAILED DESCRIPTION OF THE INVENTION

As shown on FIG. 1, the invention which includes a software module and parameter file is installed on the PC and configured to limit the use of USB devices and applications by using the following steps:

(i) Step 1—Continuously monitor all USB ports.
(ii) Step 2—Detect a new device connected to a USB port.
(iii) Step 3—Identify the type of device.
(iv) Step 4—Compare the device type to the list of authorized devices stored in the invention's configuration parameter file.
  i. Step 5—If the device is authorized allow the connection.
  ii. Step 6—If the device is unauthorized do not allow the connection.
(v) Steps 7 and 8—If an authorized USB storage device is connected, examine the files and executables contained on the device.
  i. Steps 9 and 10—If the files and (or) executables are included in the list of authorized files and executables stored in the inventions configuration parameter file, allow these files to be accessed from the USB storage device.
  ii. Steps 9 and 11 If the files and (or) executables are not included in the list of authorized files and executables stored in the invention's configuration parameter file, deny access to the files.

As shown in FIG. 2, a USB storage device containing unauthorized software is inserted to local or remote PC. The invention installed on the PC and configured in accordance with the security policy detects the unauthorized executable program and prevents the software from functioning.

In another example as shown in FIG. 3, a USB storage device containing authorized software is inserted to a local or remote PC. The invention installed on the PC detects the authorized application and allows the program to execute in accordance with the security policy and configuration rules in place.

In another example as shown in FIG. 4, an unauthorized USB non-storage device such as a printer, scanner, camera or other device is inserted into the USB port of a local or remote PC. The invention installed on the PC detects the unauthorized device and prevents the device from functioning in accordance with the security policy and configuration rules in place.

In another example as shown in FIG. 5, an authorized USB non-storage device such as a printer, scanner, camera or other device is inserted into the USB port of a local or remote PC. The invention installed on the PC detects the authorized device and allows the device to function in accordance with the security policy and configuration rules in place.

As shown in FIG. 6, the invention can also be configured to periodically receive updates from the file server software via internet or intranet connection. The file server is used to update configuration rules to that are used control the USB devices and applications which may be used in accordance with the security policy. The file server is also used as a central repository for storing all logged all security events.

Having thus described the invention in detail, it should be apparent that various modifications and changes may be made without departing from the spirit and scope of the present invention. Consequently, these and other modifications are contemplated to be within the spirit and scope of the following claims.

I claim:

1. A memory device having instructions stored thereon that, in response to execution by a processing device, cause the processing device to perform operations comprising:
  detecting a coupling of a peripheral to an input/output interface of a host;
  in response to detecting the coupling, identifying a device type of the peripheral;
  determining whether the identified device type is authorized; and
  preventing the peripheral from performing at least one function in accordance with a security policy in response to determining that the identified device type is not authorized.

2. The memory device of claim 1, wherein the operations further comprise allowing the peripheral to perform the at least one function in accordance with the security policy in response to determining that the identified device type is authorized.

3. The memory device of claim 1, wherein the input/output interface comprises a Universal Serial Bus (USB) interface.

4. The memory device of claim 1, wherein the operations further comprise:
  in response to detecting the coupling, identifying data corresponding to a file or executable program stored on the peripheral;
  determining whether the corresponding file or executable program is authorized; and
  denying access to the identified data over the input/output interface in response to determining that the corresponding file or executable program is not authorized.

5. The memory device of claim 4, wherein determining whether the corresponding file or executable program is authorized is in response to determining that the identified device type is authorized.

6. The memory device of claim 4, wherein the operations further comprise allowing access to the identified data over the input/output interface in response to determining that the file or executable program is authorized.

7. The memory device of claim 1, wherein the operations further comprise downloading a configuration file stored on a remote network device.

8. The memory device of claim 7, wherein determining whether the identified device type is authorized comprises comparing the identified device type to a list of device types indicated by the downloaded configuration file.

9. The memory device of claim 7, wherein the operations further comprise periodically communicating with the remote network device after downloading the configuration file to check for an update corresponding to the downloaded configuration file.

10. The memory device of claim 1, wherein the identified device type comprises at least one selected from a group including a printer device type, a camera device type, a scanner device type, and a non-volatile storage device type.

11. A machine-implemented method, comprising:
  detecting a coupling of a peripheral to an input/output interface of a host;
  in response to detecting the coupling, identifying a device type of the peripheral;
  determining whether the identified device type is authorized; and
  preventing the peripheral from performing at least one function in accordance with a security policy in response to determining that the identified device type is not authorized, wherein preventing the peripheral from performing the at least one function in accordance with the security policy comprises changing a configuration stored in a memory of the host.

12. The machine-implemented method of claim 11, further comprising allowing the peripheral to perform the at least one function in accordance with the security policy in response to determining that the identified device type is authorized.

13. The machine-implemented method of claim 11, wherein the input/output interface comprises a Universal Serial Bus (USB) interface.

14. The machine-implemented method of claim 11, further comprising:
- in response to detecting the coupling, identifying data corresponding to a file or executable program stored on the peripheral;
- determining whether the corresponding file or executable program is authorized; and
- denying access to the identified data over the input/output interface in response to determining that the file or executable program is not authorized.

15. The machine-implemented method of claim 14, wherein determining whether the corresponding file or executable program is authorized is in response to determining that the identified device type is authorized.

16. The machine-implemented method of claim 14, further comprising allowing access to the identified data over the input/output interface in response to determining that the file or executable program is authorized.

17. The machine-implemented method of claim 11, further comprising downloading a configuration file over a network.

18. The machine-implemented method of claim 17, wherein determining whether the identified device type is authorized comprises comparing the identified device type to a list of device types indicated by the downloaded configuration file.

19. The machine-implemented method of claim 17, further comprising periodically communicating over the network after downloading the configuration file to check for an update corresponding to the downloaded configuration file.

20. The machine-implemented method of claim 11, wherein the identified device type comprises at least one selected from a group including a printer device type, a camera device type, a scanner device type, and a non-volatile storage device type.

21. An apparatus, comprising:
- means for detecting a coupling of a peripheral to an input/output interface of a host;
- means for identifying a device type of the peripheral in response to detecting the coupling;
- means for determining whether the identified device type is authorized; and
- means for preventing the peripheral from performing at least one function in accordance with a security policy in response to determining that the identified device type is not authorized.

22. The apparatus of claim 21, wherein the input/output interface comprises a Universal Serial Bus (USB) interface.

* * * * *